United States Patent

[11] 3,587,818

| [72] | Inventor | Howard C. Hansen<br>Battle Creek, Mich. |
|---|---|---|
| [21] | Appl. No. | 745,261 |
| [22] | Filed | July 16, 1968 |
| [45] | Patented | June 28, 1971 |
| [73] | Assignee | Clark Equipment Company |

[54] MEANS AND METHOD FOR TRANSPORTING ARTICLES WITH A CONVEYOR SYSTEM
6 Claims, 3 Drawing Figs.

[52] U.S. Cl. .................................................. 198/20, 198/78
[51] Int. Cl. .................................................. B65g 47/00
[50] Field of Search .................................... 198/78, 33 (R1), 20, 104, 32, 22, 213, 127

[56] References Cited
UNITED STATES PATENTS
849,122    4/1907    George ........................... 198/104

2,341,342    2/1944    Taylor et al. ..................... 198/20
FOREIGN PATENTS
1,292,594    3/1962    France ........................... 198/127
248,077    1/1963    Australia ......................... 198/213

Primary Examiner—Evon C. Blunk
Assistant Examiner—Douglas D. Watts
Attorneys—Kenneth C. Witt, John D. Wiessler, Robert H. Johnson and Reginald J. Falkowski ABSTRACT: A conveyor system has a main conveyor and an auxiliary conveyor intersecting the main conveyor to enable transferring of articles between the conveyors. The main conveyor has a section of helical thread rollers adjacent the intersection with the auxiliary conveyor. A roller on each side of the section of helical thread rollers can be raised above the level of the conveyor to block an article. The helical threads then operate to produce a lateral force on the article to move the article to the auxiliary conveyor.

PATENTED JUN 28 1971          3,587,818

INVENTOR
HOWARD C. HANSEN
BY R. J. Falbowski
ATTORNEY

MEANS AND METHOD FOR TRANSPORTING ARTICLES WITH A CONVEYOR SYSTEM This invention relates to conveyor systems, particularly to conveyor systems that transfer articles from one roller conveyor to another intersecting conveyor.

One of the problems of transporting and transferring articles with conveyor systems is the difficulty of providing a simple and efficient means for transferring articles from one conveyor to another. While systems have been developed to shift articles, these systems are generally not practical with heavier loads. With this invention a conveyor system is provided that enables heavy articles to be handled and transported along a conveyor system, and selectively transferred to any intersecting conveyor.

This invention generally comprises a powered roller main conveyor of any known type with a section of rollers adjacent to an intersecting conveyor each having a raised helical thread. A means for blocking the movement of an article along the main conveyor stops the article and enables the helical threads to laterally move the article.

The objects and advantages of this invention will be apparent from the following detailed description of an embodiment of the invention.

Figure 1:
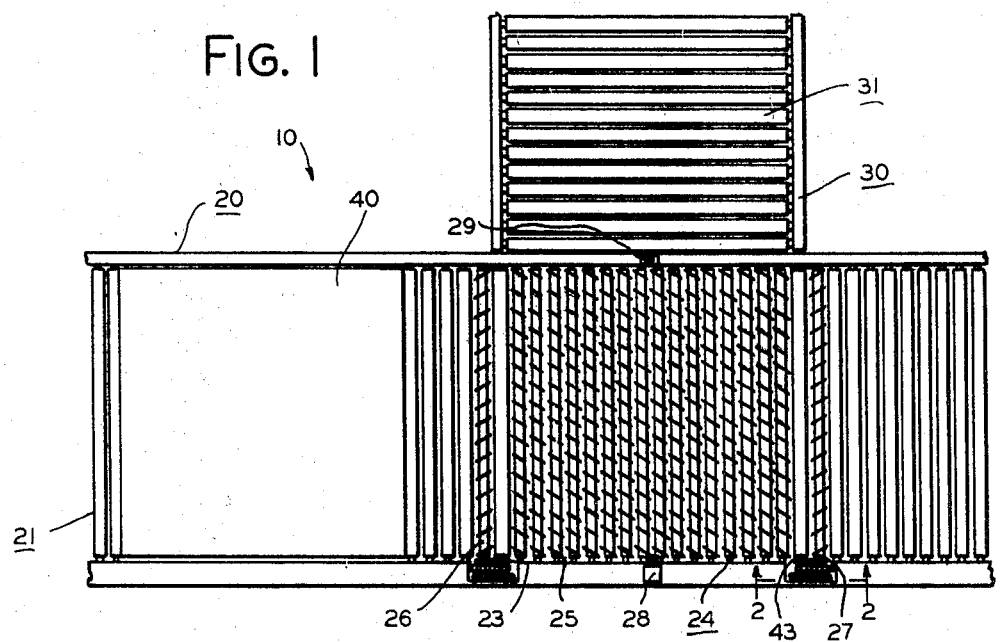
FIG. 1 is a top view of a portion of a conveyor system embodying this invention.

Referring to FIG. 1, a conveyor system 10 comprises a main conveyor 20 and an auxiliary carrier or conveyor 30 that intersects the main conveyor. Auxiliary conveyor 30 is shown as a powered roller conveyor but depending upon the type of system utilized, it could be any type of article carrier that intersects main conveyor 20 for purposes of receiving articles from or delivering articles to the main conveyor.

An article 40 is supported on a portion of main conveyor 20 and is moved by powered rollers 21 in either direction as selected.

Main conveyor 20 is generally of any known type and comprises any known supporting structure (not fully shown); powered rollers 21, including a section 23 of transfer rollers 24 having raised helical threads 25 with a direction of pitch selected to produce a screw movement in a selected direction.

Means for rotating the rollers of the main conveyor, of any type known in the art (shown partially in FIG. 2), rotate the rollers in main conveyor 20 to move pallet supported articles, such as article 40.

A means for blocking movement of an article comprises blocking rollers 26 and 27, one on each side of section 16 having transfer rollers 24, with blocking roller 26 to the left of section 16 and blocking roller 27 to the right of section 16. Blocking rollers 26 and 27 have raised helical threads with a direction of pitch opposite to the direction of pitch of the threads of transfer rollers 24. A means for rotating the blocking roller and a means for raising and lowering the blocking roller (shown partially in FIG. 2) of any known type are provided. The means for raising and lowering blocking rollers also comprises a position-sensing switch 28 that produces a signal when an article is pushed against it and a position-sensing switch 29 that produces a signal when there is no article above it.

Auxiliary conveyor article similarly has a means (not shown) of any type known in the art to rotate powered rollers 31 in a selected direction.

Figure 2:
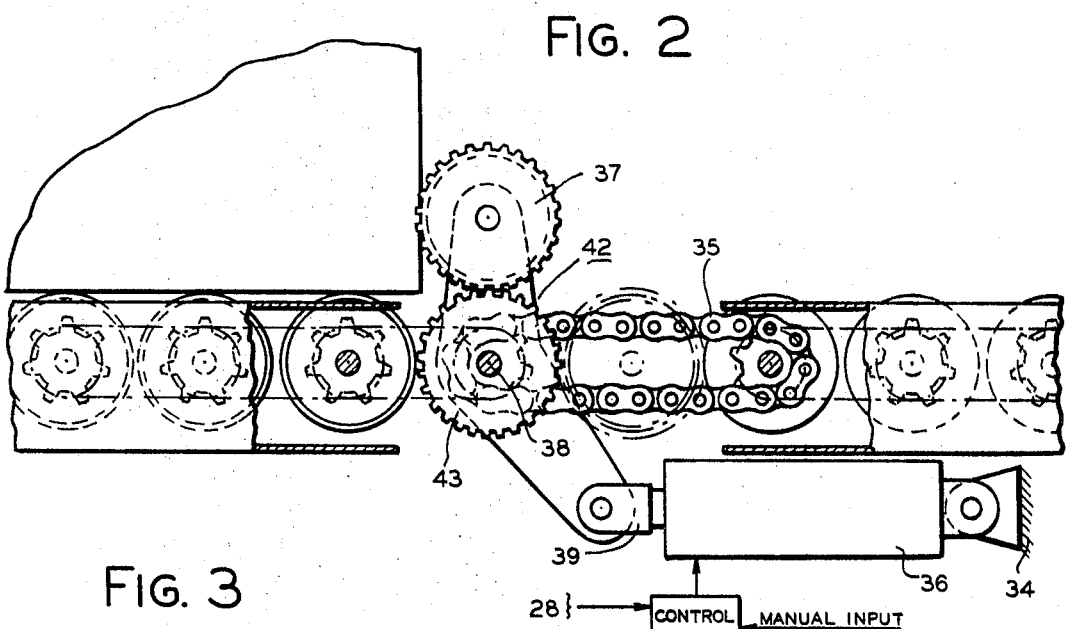
FIG. 2 is a side view of a portion of the conveyor system taken along line 2-2 as shown in FIG. 1.

FIG. 2 shows article 40 in position over transfer rollers 24 and stopped by blocking roller 27 with article 40 moving from left to right as shown. The means for rotating the rollers in the same direction is partially shown as comprising a series of linking chains 35 connecting one roller to an adjacent roller with a power takeoff from any suitable power source (not shown) in any manner known in the art.

Blocking roller 27, referring to FIG. 2, is raised and lowered by an actuator 36 that is controlled manually or by a control system 50 of any suitable type, that responds to selected input signals including signals received from switches 28 and 29 to raise and lower blocking roller 27 as required. Blocking roller 27 is raised and lowered by actuator 36 through engagement of an arm 37 that swings on a pivot 38 upon movement of a plunger 39 of actuator 36 inwardly and outwardly from a base mounting 34, and is powered through a gear drive 42 connected to intermediate roller 43.

The means for raising and lowering blocking roller 26 is the same as for blocking roller 27 and is not specifically shown.

OPERATION

In the operation of the system, referring primary to FIG. 1, article 40 is placed on main conveyor 20 with powered rollers 21 rotating to move article 40 from left to right, as shown in FIG. 1. For normal transfer along main conveyor 20, blocking rollers 26 and 27 are maintained in a lowered position. Blocking rollers 26 and 27 rotate in a direction opposite to the other rollers. The conveyor is constructed so that the blocking rollers are below the level of rollers adjacent to it when in the lowered position and therefore do not interfere with the progression of articles along the main conveyor. The articles are moved by the rollers along the main conveyor and are not substantially moved to either side by the helical threads of the transfer rollers as the articles ride over the transfer rollers.

To transfer an article from main conveyor 20 to auxiliary conveyor 30, blocking roller 27 is raised by the actuation of actuator 36, to take the position shown to FIG. 2, to block further movement of the article along the main conveyor. The helical threads of transfer rollers 24 produce, by digging slightly into the pallet or bottom of the article, a screw movement force or effect on the article to move it laterally relative to the main conveyor to transfer the article to the auxiliary conveyor.

The complete transfer of the article from the main conveyor to the auxiliary conveyor is accomplished by rollers 31 of the auxiliary conveyor and by the screw effect of the helical threads. The operation may be controlled completely manually or partly automatically by using switch 29 to indicate that article 40 has moved fully onto the auxiliary conveyor and effect actuation of actuator 36 to lower blocking roller 27, if desired, for the next article.

Since blocking roller 27 rotates in a direction opposite to direction of rotation of transfer rollers 24 and since it has a screw direction pitch opposite to that of the transfer rollers, it also produces a screw movement effect on the article to move it from the main conveyor toward the auxiliary conveyor. In addition, the downward rotation of the blocking roller relative to the article assists in preventing article 40 from riding over the top of the blocking roller.

The conveyor system is also operable to transfer an article from auxiliary conveyor 30 onto main conveyor 20. For this operation, the powered rollers rotate in a direction opposite to that described with powered rollers 31 of auxiliary conveyor 30 rotating to move articles from the top to bottom and powered rollers 21 of main conveyor 20 rotating to move articles from right to left, as shown in FIG. 1.

In operation, an article is placed upon auxiliary conveyor 30 and as it moves onto the main conveyor, blocking roller 26 is raised to prevent the forward movement of the article along main conveyor 20 until the article is fully moved onto the main conveyor. With blocking roller 26 raised, an article being received by the main conveyor from auxiliary conveyor 30 is moved onto the main conveyor by the screw action of transfer rollers 24, the rotation of rollers 31, and the rotation of blocking roller 26 with its helical threads assisting in moving the article and its direction of rotation and assisting in preventing the article from riding over the top of the blocking roller. When the article has reached the proper position on the main conveyor, blocking roller 26 is lowered, either manually or by a signal produced by switch 28 as the article operates the switch and the article moves from right to left, as shown in FIG. 1.

The utilization of this type of conveyor system may be varied with the use of alternatively pitched transfer rollers able to be raised and lowered selectively into communication with articles. This permits a system of great versatility in the transfer of materials either to or from the intersecting conveyors.

Figure 3:
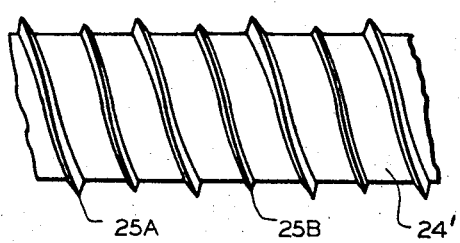
FIG. 3 is a partial end view of an embodiment of a roller according to this invention.

Also, in order to handle loads of different weights, rollers, such as roller 24' shown in FIG. 3, having two or more threads of different depths may be used. By providing two or more sets of helical threads, such as threads 25A and 25B, each differing in height from the other by a small amount, such as 0.02 inches, light loads will be carried by the higher threads alone without penetration by the lower threads and heavier loads will be carried by both threads, or in multiple thread construction, by the necessary number to support the greater weight.

While this specification contains a written description of the invention and the manner and process of making and using it and sets forth the best mode contemplated by me of carrying out my invention there are many variations, combinations, alterations and modifications of the invention that can be made within the spirit of the invention and the scope of the appended claims.

I claim:

1. A method of transporting pallet-supported or similar articles with a conveyor system having a conveyor and an article carrier adjacent the conveyor and with the conveyor having article-carrying rollers with a section of raised helical thread transfer rollers in that portion of the conveyor adjacent the auxiliary carrier comprising:
   placing an article on the carrier,
   operating the carrier to move the article toward the conveyor,
   blocking movement of the article along the main conveyor, and
   unblocking the article to permit the conveyor rollers to move the article along the conveyor after the article has been fully moved onto the conveyor by the carrier and the lateral force applied to the article by the raised helical threads of the transfer rollers.

2. A conveyor system comprising:
   a main conveyor having a plurality of powered rollers with a section of transfer rollers each having a raised helical thread with a selected direction of pitch;
   an article carrier adjacent the section of transfer rollers of the main conveyor; and
   means for blocking movement of an article along the main conveyor to position the article at least in part on the section of transfer rollers at a location adjacent the carrier;
   wherein said means for blocking comprises:
   a blocking roller located in the main conveyor adjacent the section of transfer rollers and having a raised helical thread with a pitch opposite in direction to the pitch of the threads of said transfer rollers,
   means for rotating the blocking roller in a direction opposite to the direction of rotation of the transfer rollers, and
   means for raising the blocking roller above adjacent rollers to block movement of an article along the main conveyor to thereby effect movement of said article from said main conveyor to the carrier at least in part by the screw effect of the transfer rollers and for lowering said blocking roller below said adjacent rollers to permit carrying of said article by said main conveyor and said transfer rollers without moving said article to said carrier.

3. A conveyor system comprising:
   a main conveyor having a plurality of powered rollers with a section of transfer rollers each having a raised helical thread with a selected direction of pitch;
   an article carrier adjacent the section of transfer rollers of the main conveyor; and
   means for blocking movement of an article along the main conveyor to position the article at least in part on the section of transfer rollers at a location adjacent the carrier
   wherein said means for blocking comprises:
   a blocking roller located in the main conveyor adjacent the section of transfer rollers and having a raised helical thread with a pitch opposite in direction to the pitch of the threads of said transfer rollers,
   means for rotating the blocking roller in a direction opposite to the direction of rotation of the transfer rollers, and
   means for raising the blocking roller above adjacent rollers to block movement of an article along the main conveyor to thereby effect movement of said article from the carrier onto said main conveyor at least in part by the screw effect of the transfer rollers and for lowering the blocking roller below said adjacent rollers to permit carrying of said article by said main conveyor along said main conveyor after said article has moved onto said conveyor from said carrier.

4. A conveyor system comprising:
   a main conveyor having a plurality of power rollers with a section of transfer rollers each having a raised helical thread with a selected direction of pitch;
   an article carrier adjacent the section of transfer rollers of the main conveyor; and
   means for blocking movement of an article along the main conveyor to position the article at least in part on the section of transfer rollers at a location adjacent the carrier;
   wherein said carrier is an auxiliary roller conveyor intersecting the main conveyor having powered rollers adapted to support and move articles; and
   wherein said main conveyor rollers are rotatable to carry articles in a selected direction, said auxiliary conveyor rollers are rotatable in a first direction to carry articles away from the main conveyor, and said section of transfer rollers is adjacent the intersection of the main and auxiliary conveyor and said transfer rollers are rotating in the same direction as the other main conveyor rollers and have a raised helical thread with a pitch direction selected to produce a screw movement to move article supported on said threads in a direction from said main conveyor to said auxiliary conveyor when said main conveyor rollers are rotating in the selected direction and the auxiliary conveyor rollers are rotating in the first direction to thereby transfer said articles from said main conveyor to said auxiliary conveyor and said means for blocking comprising;
   a first blocking roller located in the main conveyor adjacent the transfer rollers and having a raised helical thread with a pitch opposite in direction to the pitch of the threads of the transfer roller;
   means for rotating the blocking roller in a direction opposite to the direction of rotation of the transfer rollers; and
   means for raising the blocking roller above adjacent rollers to block movement of articles beyond the transfer rollers to thereby effect transfer of articles from the main conveyor to the auxiliary conveyor by the screw effect of said transfer rollers when the main conveyor rollers are rotated in the selected direction and for lowering said blocking roller below said adjacent rollers to permit carrying of articles by said main conveyor without moving articles to said auxiliary conveyor.

5. A conveyor system according to claim 16 wherein said transfer rollers each have a plurality of raised helical threads each raised a different height.

6. A conveyor system according to claim 16 wherein said main conveyor rollers are also rotatable to carry articles in a second direction opposite to the selected direction, said auxiliary conveyor rollers are rotatable in a second direction opposite to the first direction to carry articles to the main conveyor, and said transfer rollers when rotating in the second direction produce a screw in a direction to move articles supported on the threads from the auxiliary conveyor to the main conveyor when the main conveyor rollers are rotating in the second direction and the transfer rollers are rotating in the second direction, said first blocking rollers located in one side of the section of the transfer rollers, said means for blocking also comprises:

a second blocking roller located in the main conveyor adjacent the other side of the section of transfer rollers and having a raised helical thread with a pitch opposite in direction to the pitch of the threads of the transfer rollers;

means for rotating the second blocking roller in a direction opposite to the direction of rotation of the transfer rollers; and means for raising the blocking rollers above adjacent rollers to block movement of articles along the main conveyor when articles are received onto said main conveyor from the auxiliary conveyor and for lowering said blocking rollers below said adjacent rollers to thereby permit movement of articles along said main conveyor with said main conveyor rollers rotating in the second direction.